(12) United States Patent
Kim et al.

(10) Patent No.: US 9,276,693 B2
(45) Date of Patent: Mar. 1, 2016

(54) APPARATUS AND METHOD FOR TRANSMITTING SYNCHRONIZATION SIGNAL

(71) Applicant: ELECTRONICS AND TELECOMMUNICATIONS RESEARCH INSTITUTE, Daejeon (KR)

(72) Inventors: Hyung Jin Kim, Daejeon (KR); Seokki Kim, Daejeon (KR); Soojung Jung, Daejeon (KR); Seungkwon Cho, Daejeon (KR); Sung Cheol Chang, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/514,182

(22) Filed: Oct. 14, 2014

(65) Prior Publication Data

US 2015/0103870 A1 Apr. 16, 2015

(30) Foreign Application Priority Data

Oct. 15, 2013 (KR) .................. 10-2013-0122558
Oct. 13, 2014 (KR) .................. 10-2014-0137755

(51) Int. Cl.
*H04B 1/7156* (2011.01)
*H04J 13/00* (2011.01)
*H04J 11/00* (2006.01)

(52) U.S. Cl.
CPC ......... *H04J 13/0062* (2013.01); *H04J 11/0069* (2013.01)

(58) Field of Classification Search
CPC .............. H04J 11/0073; H04J 11/0076; H04J 13/0062; H04W 56/00; H04W 56/002; H04W 8/005
See application file for complete search history.

(56) References Cited

U.S. PATENT DOCUMENTS

| | | | |
|---|---|---|---|
| 8,781,484 B2* | 7/2014 | Baldemair et al. | 455/450 |
| 9,100,941 B2* | 8/2015 | Ratasuk et al. | |
| 2011/0007704 A1* | 1/2011 | Swarts et al. | 370/330 |
| 2011/0150156 A1* | 6/2011 | Xue et al. | 375/354 |
| 2012/0163223 A1* | 6/2012 | Lo et al. | 370/252 |
| 2013/0159554 A1 | 6/2013 | Kim et al. | |
| 2014/0064263 A1* | 3/2014 | Cheng et al. | 370/350 |
| 2014/0169361 A1* | 6/2014 | Kim et al. | 370/350 |
| 2014/0219270 A1* | 8/2014 | Ro et al. | 370/350 |
| 2014/0334388 A1* | 11/2014 | Novak et al. | 370/329 |
| 2015/0124579 A1* | 5/2015 | Sartori et al. | 370/210 |

FOREIGN PATENT DOCUMENTS

KR 10-2013-0121649 A 11/2013

OTHER PUBLICATIONS

"Subcarrier Assignment, Signal Design, Receiver Structure", Electronics and Telecommunications Research Institute, Oct. 15, 2013.

* cited by examiner

*Primary Examiner* — Aristocratis Fotakis
(74) *Attorney, Agent, or Firm* — Rabin & Berdo, P.C.

(57) ABSTRACT

A synchronization signal transmitting apparatus generates a plurality of different primary synchronization signals that are transmitted in an ultra frame unit within one super ultra frame and generates one secondary synchronization signal that is transmitted in a frame unit within one super ultra frame.

19 Claims, 9 Drawing Sheets

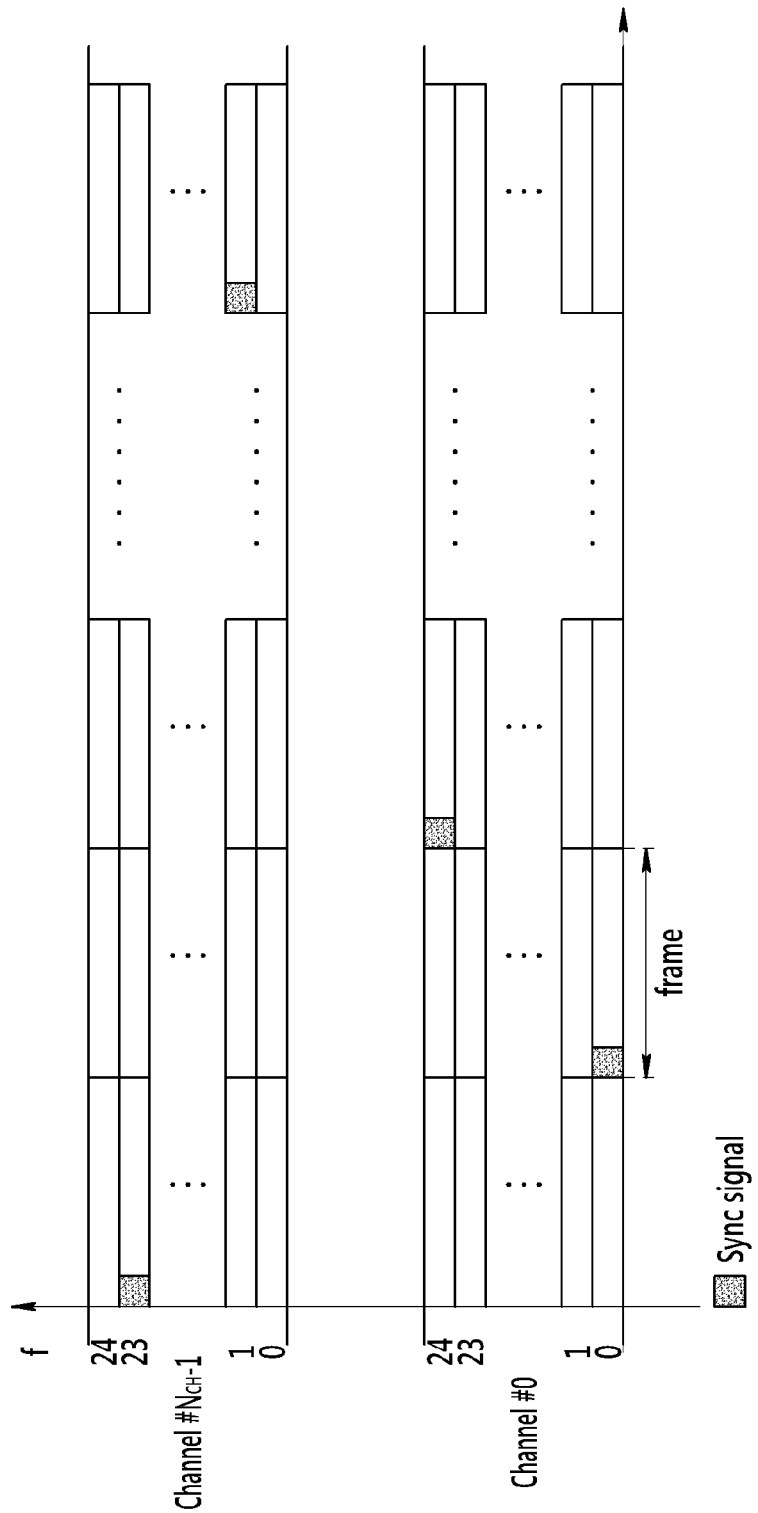

APPARATUS AND METHOD FOR TRANSMITTING SYNCHRONIZATION SIGNAL

CROSS-REFERENCE TO RELATED APPLICATION

This application claims priority to and the benefit of Korean Patent Application No. 10-2013-0122558 and 10-2014-0137755 filed in the Korean Intellectual Property Office on Oct. 15, 2013 and Oct. 13, 2014, the entire contents of which are incorporated herein by reference.

BACKGROUND OF THE INVENTION (a) Field of the Invention

The present invention relates to a method and apparatus for transmitting a synchronization signal that devices transmit for synchronization between devices. More particularly, the present invention relates to generation of a synchronization signal that devices transmit for synchronization between devices.

(b) Description of the Related Art

A conventional centralized synchronization method is a synchronization method of a master-slave concept, and in the conventional centralized synchronization method, one device occupies a resource as a master and generates and transmits a signal according to a basis of synchronization, and remaining devices receive the signal and correspond with synchronization.

Such a synchronization method can well operate in a cellular system in which one base station and several terminals exist. However, in direct communication between devices, an ad-hoc network, or a sensor network, one device should be selected to operate as a master. Further, because synchronization between devices that are selected as masters may not correspond, a problem occurs that synchronization between adjacent devices does not correspond, and thus there is a problem that devices are adjacent but cannot communicate. In order to solve the problem, a distributed synchronization method is used.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for transmitting a synchronization signal having advantages of generating a synchronization signal used in a distributed synchronization method.

An exemplary embodiment of the present invention provides a method of transmitting a synchronization signal in a synchronization signal transmitting apparatus. The method includes: generating a plurality of different primary synchronization signals (PSSs) to be transmitted in an ultra frame unit within one super ultra frame; and generating one secondary synchronization signal (SSS) to be transmitted in a frame unit within the one super ultra frame, wherein the one super ultra frame includes a plurality of ultra frames, each ultra frame includes a plurality of super frames, and each super frame includes a plurality of frames.

The generating of a plurality of different PSSs may include: generating a basic synchronization sequence to be used with one of the plurality of PSSs; and generating the remaining PSSs by cyclic shifting the basic synchronization sequence.

The generating of a basic synchronization sequence may include generating the basic synchronization sequence using a Zadoff-Chu (ZC) sequence having a root index of a first value.

The generating of one SSS may include generating the SSS using a ZC sequence having a root index of a second value different from the first value.

A cyclic shift gap and a length of the PSS may be determined according to the number of the plurality of PSSs.

The method may further include mapping and transmitting the plurality of PSSs and the SSS to a subcarrier of a frequency domain.

The transmitting of the plurality of PSSs and the SSS may include: converting each of the plurality of PSSs and the SSS that are mapped to the subcarrier to a signal of a time domain; and inserting a cyclic prefix into a signal of the time domain.

The transmitting of the plurality of PSSs and the SSS may include converting each of the plurality of PSSs and the SSS to a signal of a frequency domain before mapping to the subcarrier.

Another embodiment of the present invention provides a synchronization signal transmitting apparatus. The synchronization signal transmitting apparatus includes a synchronization signal generator, a first converter, a subcarrier mapper, a second converter, and a cyclic prefix (CP) insertion unitThe synchronization signal generator generates a synchronization signal including a plurality of different primary synchronization signals (PSSs) and one secondary synchronization signal (SSS). The first converter converts the synchronization signal to a signal of a frequency domain. The subcarrier mapper maps a signal of the frequency domain to a subcarrier of the frequency domain. The second converter converts a synchronization signal that is mapped to the subcarrier to a signal of a time domain. The CP insertion unit inserts a cyclic prefix into a signal of the time domain and transmits it.

One super ultra frame may include a plurality of ultra frames, each ultra frame may include a plurality of super frames, and each super frame may include a plurality of frames, and the plurality of PSSs may be transmitted in an ultra frame unit within a super ultra frame, and the SSS may be transmitted in a frame unit within the super ultra frame.

The SSS may be transmitted in every frame.

The synchronization signal generator may include: a sequence generator that generates a Zadoff-Chu (ZC) sequence of a first root index value; and a cyclic shift unit that generates the plurality of PSSs by cyclic shifting a ZC sequence of the first root index value.

The sequence generator may use a ZC sequence of a second root index value as the SSS.

A cyclic shift gap and a length of the PSS may be determined according to the number of the plurality of PSSs.

The subcarrier mapper may determine a synchronization subchannel of a frequency domain to map a signal of the frequency domain according to frequency hopping.

BRIEF DESCRIPTION OF THE DRAWINGS

FIG. 12 is a diagram illustrating a frequency hopping method according to an exemplary embodiment of the present invention.

DETAILED DESCRIPTION OF THE EMBODIMENTS

Figure 1:
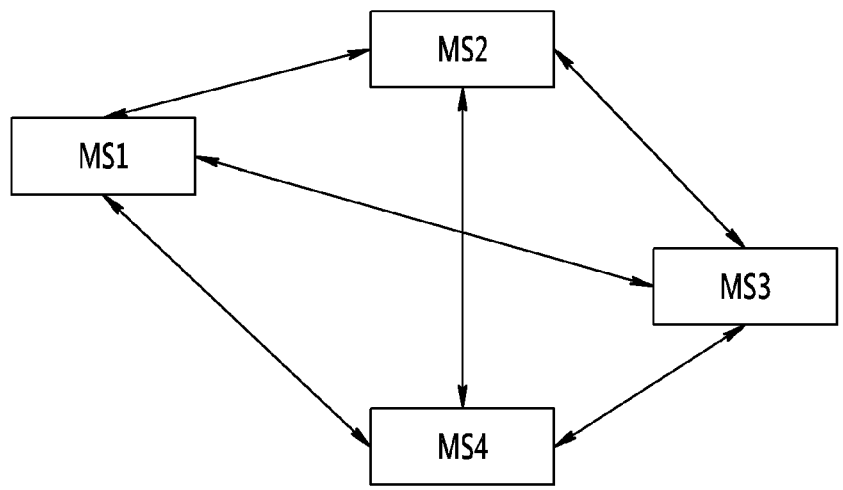
FIG. 1 is a diagram illustrating a direct communication system between terminals according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for transmitting a synchronization signal according to an exemplary embodiment of the present invention will be described in detail with reference to the drawings.

FIG. 1 is a diagram illustrating a direct communication system between terminals according to an exemplary embodiment of the present invention.

Referring to FIG. 1, a direct communication system between terminals includes a plurality of terminals MS1, MS2, MS3, and MS4.

The terminals MS1, MS2, MS3, and MS4 can perform device-to-device (D2D) communication with an adjacent terminal. D2D communication is a method of supporting direct communication without using an infrastructure such as a base station to physically adjacent terminals.

Terminals MS1, MS2, MS3, and MS4 that participate in D2D communication correspond time synchronization or frequency synchronization using a synchronization signal with another terminal that performs D2D communication.

Figure 2:
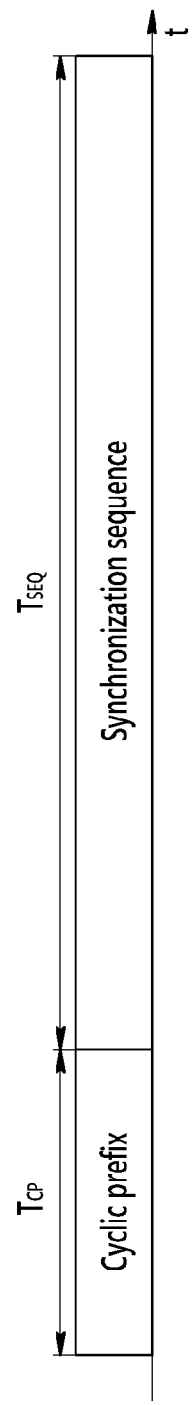
FIG. 2 is a diagram illustrating a synchronization signal in a time domain according to an exemplary embodiment of the present invention.

FIG. 2 is a diagram illustrating a synchronization signal in a time domain according to an exemplary embodiment of the present invention.

Referring to FIG. 2, in a time domain, a synchronization signal includes a cyclic prefix segment $T_{CP}$ and a synchronization sequence segment $T_{SEQ}$.

The cyclic prefix segment $T_{CP}$ includes a cyclic prefix, and the synchronization sequence segment $T_{SEQ}$ includes a synchronization sequence. The cyclic prefix may use samples that are located behind a random length of the synchronization sequence.

For example, a cyclic prefix segment $T_{CP}$ of a synchronization signal includes 256 samples, a synchronization sequence segment $T_{SEQ}$ includes 1024 samples, and final 256 samples of the synchronization sequence segment $T_{SEQ}$ may be used as the cyclic prefix.

In an exemplary embodiment of the present invention, as a synchronization signal, a primary synchronization signal (PSS) and a secondary synchronization signal (SSS) are used.

Figure 3:
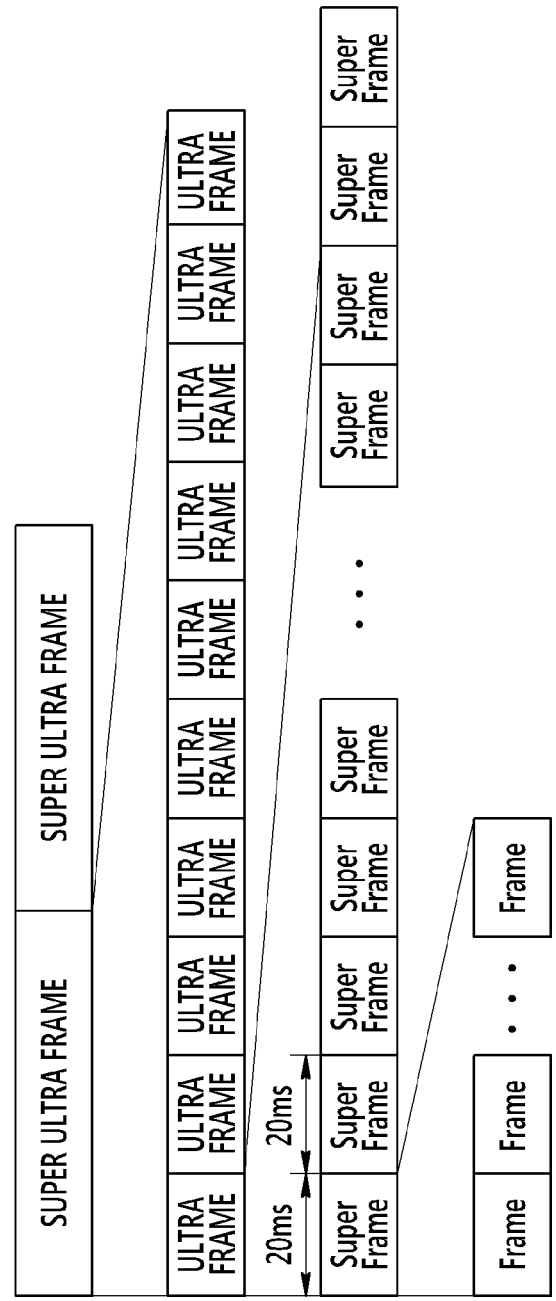
FIG. 3 is a diagram illustrating an example of a frame structure in D2D communication according to an exemplary embodiment of the present invention.
Figure 4:
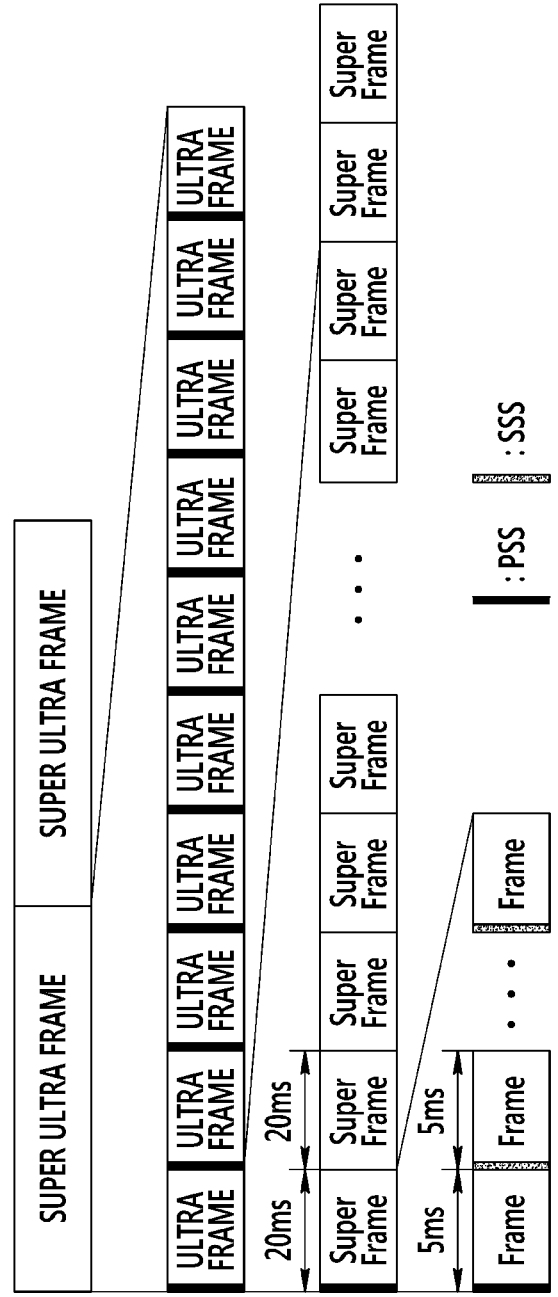
FIG. 4 is a diagram illustrating synchronization signal transmission in a frame structure of FIG. 3.

FIG. 3 is a diagram illustrating an example of a frame structure in D2D communication according to an exemplary embodiment of the present invention, and FIG. 4 is a diagram illustrating synchronization signal transmission in a frame structure of FIG. 3.

Referring to FIG. 3, in a frame structure for D2D communication, a super ultra frame is defined. The super ultra frame includes a plurality of ultra frames, and each ultra frame includes a plurality of super frames. Further, each super frame includes a plurality of frames.

For example, the super ultra frame may include 8 ultra frames in which a duration time is 1 s, and the ultra frame may include 50 super frames in which a duration time is 20 ms. Further, the super frame may include 4 frames in which a duration time is 5 ms.

The PSS is transmitted in an ultra frame unit, and the SSS is transmitted in a frame unit. For example, as shown in FIG. 4, the PSS may be transmitted in every ultra frame and may be transmitted in every ultra frame of a predetermined number. The SSS may be transmitted in every frame.

Further, a plurality of PSSs that are transmitted within one super ultra frame have different synchronization sequences. The plurality of PSSs that are transmitted within one super ultra frame may use one synchronization sequence as a basis, and may be generated by cyclic shifting the synchronization sequence used as a basis. In this case, as a synchronization sequence using as the PSS, a Zadoff-Chu (ZC) sequence may be used.

Therefore, a boundary of a frame may be detected through the SSS, and a boundary of a super ultra frame may be detected through the PSS.

Figure 5:
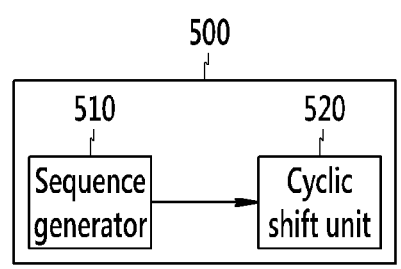
FIG. 5 is a diagram illustrating a synchronization signal generating apparatus according to an exemplary embodiment of the present invention.

FIG. 5 is a diagram of a synchronization signal generating apparatus according to an exemplary embodiment of the present invention.

Referring to FIG. 5, a synchronization signal generating apparatus 500 includes a basic sequence generator 510 and a cyclic shift unit 520.

The basic sequence generator 510 defines a Zadoff-Chu (ZC) sequence in a frequency domain, and uses the ZC sequence as a PSS and an SSS. In the ZC sequence, an n-th element $x_u(n)$ of a ZC sequence, which is a root index u, may be represented by Equation 1.

$$x_u(n) = e^{-j\frac{\pi u n(n+1)}{N_{ZC}}}, 0 \le n \le N_{ZC} - 1 \quad \text{(Equation 1)}$$

In Equation 1, $N_{ZC}$ is a length of a ZC sequence, and n is a resource index representing a subcarrier in a frequency domain.

When a root index u has different values, even if the same frequency resource is used at the same time, ZC sequences may be distinguished.

The sequence generator 510 generates a synchronization sequence to use as a PSS and an SSS using a root index value. The sequence generator 510 generates a ZC sequence having a u value of 1 as a basic synchronization sequence to use as a PSS, and generates a ZC sequence having a u value of 0 as an SSS. Alternatively, the basic sequence generator 510 may generate a ZC sequence having a u value of 0 as a basic synchronization sequence to use as a PSS, and generates a ZC sequence having a u value of 1 as an SSS.

In an exemplary embodiment of the present invention, a plurality of PSSs are used within one super ultra frame. The plurality of PSSs are generated by the cyclic shift unit 520. In the same root index, sequences that are generated by cyclic shifting a basic synchronization sequence have orthogonality.

The cyclic shift unit 520 generates a plurality of PSSs by cyclic shifting a basic synchronization sequence that is generated by Equation 1. The cyclic shift unit 520 generates a plurality of PSSs to use within a super ultra frame by cyclic shifting a basic synchronization sequence, as in Equation 2.

$$x_{u,v}(n) = x_u((n+C_v) \bmod N_{ZC}) \quad \text{(Equation 2)}$$

In Equation 2, $C_v$ is a cyclic shift value, and mod represents a modular operation.

$C_v$ may be determined by Equation 3.

$$C_v = v N_{CS}, v=0,1,\ldots,\lfloor N_{ZC}/N_{CS}\rfloor 1 \quad \text{(Equation 3)}$$

where $\lfloor N_{ZC}/N_{CS}\rfloor$ represents the maximum integer among integers smaller by a parameter x than $N_{ZC}/N_{CS}$ or the same integer as $N_{ZC}/N_{CS}$, and $N_{CS}$ represents a cyclic shift gap. Therefore, the number of PSSs to use within a super ultra frame may be determined by $\lfloor N_{ZC}/N_{CS}\rfloor$.

For example, when it is assumed that $N_{ZC}$ is 809 and $N_{SC}$ is 209, and v has a value of 0, 1, 2, and 3, a total of 4 synchronization sequences may be generated according to a value of v.

Synchronization sequences that are generated in this way are mapped and transmitted to a subcarrier of a frequency domain.

Figure 6:
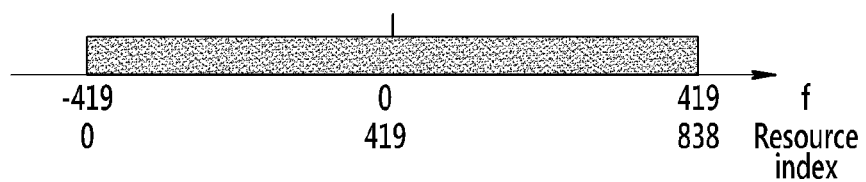
FIGS. 6 and 7 are diagrams illustrating a synchronization signal in a frequency domain according to an exemplary embodiment of the present invention.
Figure 7:
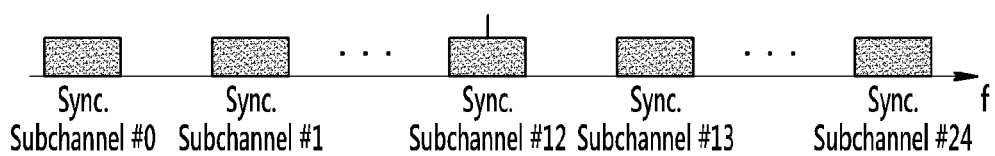

FIGS. 6 and 7 are diagrams illustrating a synchronization signal in a frequency domain according to an exemplary embodiment of the present invention.

As shown in FIG. 6, when the number of subcarriers of an available entire frequency domain is 839 and when $N_{ZC}$ is 839, each element of a ZC sequence may be mapped and transmitted to 839 subcarriers based on Equation 1. In this case, it is assumed that a subcarrier gap is 19.531 kHz and an occupying bandwidth is 16.387 MHz.

Alternatively, an available entire subcarrier may not be used, and only a partial subcarrier may be used.

Referring to FIG. 7, a frequency domain may include a plurality of synchronization subchannels (Sync.Subchannel #0-Sync.Subchannel #24) for transmitting a synchronization channel. In this case, a synchronization sequence is mapped and transmitted to a subcarrier of one synchronization subchannel of a plurality of synchronization subchannels (Sync.Subchannel #0-Sync.Subchannel #24). When it is assumed that the number of subcarriers of one synchronization subchannel is 31, a synchronization sequence is generated by Equation 1 to 3, and in this case, $N_{ZC}$ is set to 31 and NCS is set to 7.

Figure 8:
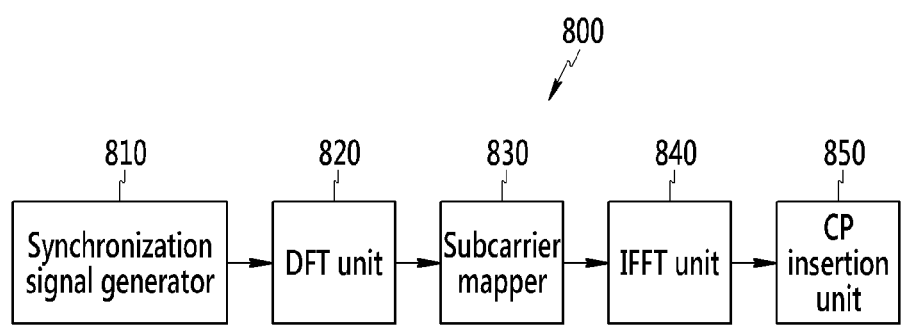
FIG. 8 is a diagram illustrating a synchronization signal transmitting apparatus according to an exemplary embodiment of the present invention.

FIG. 8 is a diagram illustrating a synchronization signal transmitting apparatus according to an exemplary embodiment of the present invention.

Referring to FIG. 8, a synchronization signal transmitting apparatus 800 includes a synchronization signal generator 810, a discrete Fourier transform (DFT) unit 820, a subcarrier mapper 830, an inverse fast Fourier transform (IFFT) unit 840, and a cyclic prefix (CP) insertion unit 850.

The synchronization signal generator 810 generates a synchronization sequence including a PSS and an SSS. The synchronization signal generator 810 corresponds to the synchronization signal generating apparatus 500 of FIG. 5.

The DFT unit 820 performs discrete Fourier transform of a generated synchronization sequence. When the number of subcarriers of an available entire frequency domain is 839, as shown in FIG. 6, the DTF unit 820 performs 839-DTF of a synchronization sequence and converts the synchronization sequence to a frequency domain. When the number of subcarriers is 31, as shown in FIG. 7, the DTF unit 820 performs 31-DTF of a synchronization sequence and converts the synchronization sequence to a frequency domain.

The subcarrier mapper 830 maps a synchronization sequence signal that is converted in a frequency domain to a subcarrier.

By performing inverse discrete Fourier transform of a synchronization sequence signal that is mapped to a subcarrier in a frequency domain, the IFFT unit 840 converts the synchronization sequence signal to a synchronization sequence signal of a time domain. The IFFT unit 840 may perform $2^n$-IFFT (where n is a natural number). For example, when a sequence signal having a length of 839 is input, the IFFT unit may perform 1024-IFFT.

The CP insertion unit 850 inserts a cyclic prefix into a synchronization sequence signal of a time domain. The CP insertion unit 850 may use a final portion of a synchronization sequence signal of a time domain as a cyclic prefix. A synchronization sequence signal of a time domain into which the cyclic prefix is inserted becomes an OFDM symbol.

A frequency of a synchronization sequence signal of a time domain into which the cyclic prefix is inserted is converted to a baseband signal and the baseband signal is transmitted. In this case, the baseband signal may be represented by Equation 4 or 5.

$$s(t) = \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k-419)\Delta f_{SS}(t-T_{CP})} \quad \text{(Equation 4)}$$

In Equation 4, $\Delta f_{SS}$ represents a subcarrier gap of a synchronization sequence signal, and k is a parameter of $\Sigma$.

$$s(t) = \sum_{k=0}^{N_{ZC}-1} \sum_{n=0}^{N_{ZC}-1} x_{u,v}(n) \cdot e^{-j\frac{2\pi nk}{N_{ZC}}} \cdot$$
$$e^{j2\pi\left(k+\left(33\times\left(k_0-\frac{N_{SCH}-1}{2}\right)-15\right)\right)\Delta f_{SS}(t-T_{CP})} \quad \text{(Equation 5)}$$

In Equation 4, a synchronization sequence having a length of 839 represents a baseband signal of a signal that is mapped to 839 subcarriers, as shown in FIG. 6.

In Equation 5, a synchronization sequence having a length of 31 represents a baseband signal of a signal that is mapped to 31 subcarriers, as shown in FIG. 7.

At least a partial function of the synchronization signal transmitting apparatus according to an exemplary embodiment of the present invention may be implemented with hardware or software that is combined to hardware. For example, a processor that is implemented with a central processing unit (CPU) or other chipset and microprocessor may perform a function of the synchronization signal generator 810, the DFT unit 820, the subcarrier mapper 830, the IFFT unit 840, and the CP insertion unit 850, and a transceiver may perform a function for transmitting the baseband signal.

Figure 9:
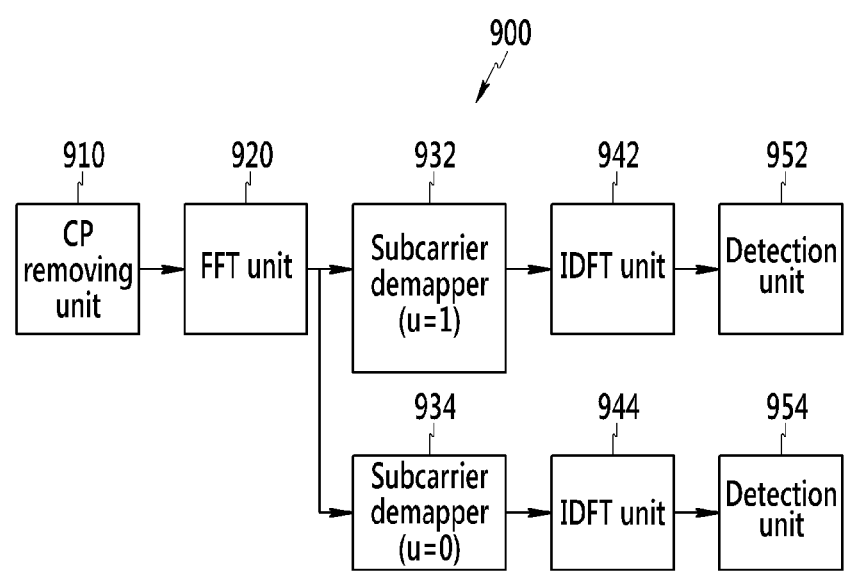
FIG. 9 is a diagram illustrating a synchronization signal receiving apparatus according to an exemplary embodiment of the present invention.

FIG. 9 is a diagram illustrating a synchronization signal receiving apparatus according to an exemplary embodiment of the present invention.

Referring to FIG. 9, a synchronization signal receiving apparatus 900 includes a CP removing unit 910, a fast Fourier transform (FFT) unit 920, subcarrier demappers 932 and 934, IDFT units 942 and 944, and detection units 952 and 954.

The CP removing unit 910 removes CP from a received OFDM symbol.

By performing fast Fourier transform (FFT) of a signal of a time domain in which the CP is removed, the FFT unit 920 converts the signal of a time domain to a signal of a frequency domain.

The subcarrier demappers 932 and 934 each extract a synchronization sequence signal of a frequency domain from a subcarrier in which a synchronization sequence of a corresponding root index u is mapped. The subcarrier demapper 932 divides a signal of a frequency domain in which FFT is performed into a ZC sequence having a value u of 1, and extracts a synchronization sequence signal corresponding to a PSS. The subcarrier demapper 934 divides a signal of a frequency domain in which FFT is performed into a ZC sequence having a value u of 0, and extracts a synchronization sequence signal corresponding to an SSS.

By performing inverse discrete Fourier transform of a synchronization sequence signal that is extracted by each of the subcarrier demappers 932 and 934, the IDFT units 942 and 944 convert the synchronization sequence signal to a signal of a time domain.

The detection units 952 and 954 detect time delay by a cyclic shift and time delay that has occurred while passing through a channel from a signal of a time domain that is converted by each of the IDFT units 942 and 944.

At least a partial function of the synchronization signal receiving apparatus according to an exemplary embodiment of the present invention may be implemented with hardware or software that is combined to hardware. For example, a processor that is implemented with a central processing unit (CPU) or other chipset and microprocessor may perform a function of the CP removing unit 910, the FFT unit 920, the subcarrier demappers 932 and 934, the IDFT units 942 and 944, and the detection units 952 and 954, and a transceiver may perform a function for receiving the baseband signal.

Figure 10:
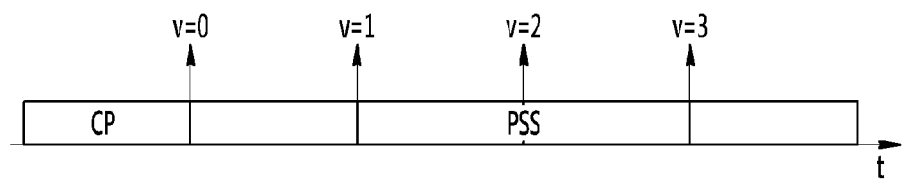
FIG. 10 is a diagram illustrating an example of a PSS of a time domain that is converted by an IDFT unit of FIG. 9.
Figure 11:
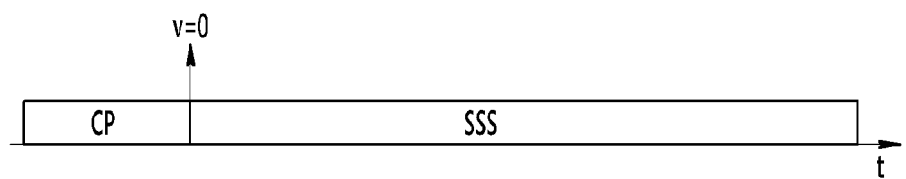
FIG. 11 is a diagram illustrating an example of an SSS of a time domain that is converted by an IDFT unit of FIG. 9.

FIG. 10 is a diagram illustrating an example of a PSS of a time domain that is converted by an IDFT unit of FIG. 9, and FIG. 11 is a diagram illustrating an example of an SSS of a time domain that is converted by an IDFT unit of FIG. 9.

As described above, when it is assumed that a total of 4 synchronization sequences with a length of 839 in which u=1 and in which a value v is 0, 1, 2, and 3 are used as the PSS, by performing IDFT of a signal of a frequency domain of 4 synchronization sequences, as shown in FIG. 10, an impulse exists at a location that is shifted by the sum of a cyclic shift value and a time delay that has occurred while passing through a channel in a time domain. In this case, when v=0, a cyclic shift value is 0, when v=1, a shift value is $N_{CS}$, when v=2, a cyclic shift value is $2*N_{CS}$, and when v=3, a shift value is $3*N_{CS}$. Therefore, the detection unit 952 may detect a start point of a corresponding synchronization sequence based on a location of an impulse.

Further, because a synchronization sequence in which u=0 and in which a v value is 0 is used as an SSS, when IDFT of a signal of a frequency domain of a synchronization sequence that is used as an SSS is performed, as shown in FIG. 11, an impulse exists at a location at which a time is delayed while passing through a channel in a time domain. Therefore, the detection unit 954 may detect a start point of a corresponding synchronization sequence based on a location of the impulse.

FIG. 12 is a diagram illustrating a frequency hopping method according to an exemplary embodiment of the present invention.

Referring to FIG. 12, frequency hopping may be performed within one channel and may be performed within several channels.

When frequency hopping is performed only within one channel, only one channel is synchronized, and when frequency hopping is performed in a multi-channel, an entire multi-channel is synchronized.

For example, the number $N_{CH}$ of multi channels (Channel #0-Channel #$N_{CH}$-1) exist, and each channel (Channel #0-Channel #$N_{CH}$-1) may include several synchronization subchannels. In this case, in a multi-channel, one synchronization subchannel may be determined in every frame according to frequency hopping. Such frequency hopping may be performed in the subcarrier mapper 830 of the synchronization signal transmitting apparatus 800.

According to an exemplary embodiment of the present invention, devices can correspond a synchronization time with a distributed method.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a synchronization signal in a synchronization signal transmitting apparatus, the method comprising:

generating a plurality of primary synchronization signals (PSSs) to be transmitted in a plurality of ultra frames within one super ultra frame, each of the plurality of PSSs to be transmitted within said one super ultra frame being generated by a different sequence; and generating a plurality of secondary synchronization signals (SSSs) to be transmitted in a plurality of frames within said one super ultra frame, each of the plurality of SSSs to be transmitted within said one super ultra frame being generated by a same sequence, wherein said one super ultra frame comprises the plurality of ultra frames, each ultra frame comprises a plurality of super frames, and each super frame comprises the plurality of frames.

2. The method of claim 1, wherein the generating of the plurality of PSSs comprises:

generating a basic synchronization sequence as one of the different sequences to be used with one of the plurality of PSSs to be transmitted within said one super ultra frame; and generating the remaining PSSs to be transmitted within said one super ultra frame by cyclic shifting the basic synchronization sequence as the rest of the different sequences.

3. The method of claim 2, wherein the generating of a basic synchronization sequence comprises generating the basic synchronization sequence using a Zadoff-Chu (ZC) sequence having a root index of a first value.

4. The method of claim 3, wherein the generating of the plurality of SSSs comprises generating the SSSs using a ZC sequence having a root index of a second value different from the first value, wherein the ZC sequence is said same sequence.

5. The method of claim 3, wherein a number of the plurality of PSSs to be transmitted within said one super ultra frame is determined according to a cyclic shift gap of said cyclic shifting and a length of the ZC sequence.

6. The method of claim 1, further comprising mapping the plurality of PSSs and the plurality of SSSs to a frequency domain subcarrier.

7. The method of claim 6, further comprising:
converting said frequency domain subcarrier to which the plurality of PSSs and the plurality of SSSs are mapped to a time domain signal; and
inserting a cyclic prefix into the time domain signal.

8. The method of claim 6, further comprising converting the plurality of PSSs and the plurality of SSSs to a frequency domain signal before mapping to the subcarrier.

9. The method of claim 1, further comprising generating orthogonal sequences as the different sequences to be used for the plurality of PSSs to be transmitted within said one super ultra frame are generated.

10. A synchronization signal transmitting apparatus, comprising:
a synchronization signal generator that generates a synchronization signal comprising a plurality of primary synchronization signals (PSSs) and a plurality of secondary synchronization signals (SSSs), each of the plurality of PPSs to be transmitted within said one super ultra frame being generated by a different sequence, the plurality of SSSs to be transmitted within said one super ultra frame being generated by a same sequence;
a first converter that converts the synchronization signal to a frequency domain signal;
a subcarrier mapper that maps the frequency domain signal to a subcarrier;
a second converter that converts the subcarrier to which the frequency domain signal is mapped to a time domain signal; and
a cyclic prefix insertion unit that inserts a cyclic prefix into the time domain signal and transmits the cyclic prefix inserted time domain signal.

11. The synchronization signal transmitting apparatus of claim 10, wherein one super ultra frame comprises a plurality of ultra frames, each ultra frame comprises a plurality of super frames, and each super frame comprises a plurality of frames, and
the plurality of PSSs are transmitted in the plurality of ultra frames within one super ultra frame, and the plurality of SSSs are transmitted in the plurality of frames within said one super ultra frame.

12. The synchronization signal transmitting apparatus of claim 11, wherein each of the plurality of SSSs is transmitted in a different one of the plurality of frames.

13. The synchronization signal transmitting apparatus of claim 10, wherein the synchronization signal generator comprises:

a sequence generator that generates a Zadoff-Chu (ZC) sequence of a first root index value as one of the different sequences; and
a cyclic shift unit that generates the plurality of PSSs by cyclic shifting the ZC sequence of the first root index value as the rest of the different sequences.

14. The synchronization signal transmitting apparatus of claim 13, wherein the sequence generator uses a ZC sequence of a second root index value as said same sequence for generating each SSS.

15. The synchronization signal transmitting apparatus of claim 13, wherein a number of the plurality of PSSs to be transmitted within said one super ultra frame is determined according to a cyclic shift gap of said cyclic shifting and a length of the ZC sequence.

16. The synchronization signal transmitting apparatus of claim 10, wherein the subcarrier mapper determines a synchronization subchannel of a frequency domain to map the frequency domain signal according to frequency hopping.

17. The synchronization signal transmitting apparatus of claim 10, wherein the synchronization signal generator generates orthogonal sequences as the different sequences that are used for generating the plurality of PSSs to be transmitted within said one super ultra frame.

18. A method of transmitting a synchronization signal in a synchronization signal transmitting apparatus, the method comprising:
generating a predetermined number of primary synchronization signals (PSSs), to be transmitted in said predetermined number of ultra frames within one super ultra frame, each of said predetermined number of the PSSs to be transmitted within said one super ultra frame being generated by a different sequence; and
generating a plurality of secondary synchronization signals (SSSs) to be transmitted in a plurality of frames within said one super ultra frame, each of the plurality of SSSs to be transmitted within said one super ultra frame being generated by a same sequence,
wherein said one super ultra frame comprises said predetermined number of the plurality of ultra frames, each ultra frame comprises a plurality of super frames, and each super frame comprises a plurality of frames.

19. A synchronization signal transmitting apparatus, comprising:
a synchronization signal generator that generates a synchronization signal comprising a predetermined number of primary synchronization signals (PSSs) and a plurality of secondary synchronization signals (SSSs), each of the plurality of PPS s to be transmitted within said one super ultra frame being generated by a different sequence, the plurality of SSSs to be transmitted within said one super ultra frame being generated by a same sequence;
a first converter that converts the synchronization signal to a frequency domain signal;
a subcarrier mapper that maps the frequency domain signal to a subcarrier;
a second converter that converts the subcarrier to which the frequency domain signal is mapped to a time domain signal; and
a cyclic prefix insertion unit that inserts a cyclic prefix into the time domain signal and transmits the cyclic prefix inserted time domain signal.

* * * * *